(12) United States Patent
Chen et al.

(10) Patent No.: US 12,477,098 B2
(45) Date of Patent: Nov. 18, 2025

(54) IMAGE SENSOR TESTING SYSTEM

(71) Applicant: ARDENTEC CORPORATION, HsinChu County (TW)

(72) Inventors: Yu-Hsing Chen, HsinChu County (TW); Chen-An Fang, HsinChu County (TW); Syue-Ling Yan, HsinChu County (TW)

(73) Assignee: ARDENTEC CORPORATION, Hsinchu County (TW)

( * ) Notice: Subject to any disclaimer, the term of this patent is extended or adjusted under 35 U.S.C. 154(b) by 281 days.

(21) Appl. No.: 18/387,479

(22) Filed: Nov. 7, 2023

(65) Prior Publication Data
US 2024/0163417 A1    May 16, 2024

(30) Foreign Application Priority Data
Nov. 16, 2022  (TW) ................................ 111212573

(51) Int. Cl.
*H04N 17/00* (2006.01)
*G06T 7/00* (2017.01)

(52) U.S. Cl.
CPC ........... *H04N 17/002* (2013.01); *G06T 7/001* (2013.01); *G06T 2207/30148* (2013.01)

(58) Field of Classification Search
USPC ....................................................... 382/145
See application file for complete search history.

(56) References Cited

U.S. PATENT DOCUMENTS

| | | | |
|---|---|---|---|
| 7,251,576 B2* | 7/2007 | Su | G01R 31/2641 |
| | | | 702/116 |
| 2009/0135414 A1 | 5/2009 | Chang et al. | |
| 2012/0314086 A1 | 12/2012 | Hubel et al. | |
| 2021/0009145 A1 | 1/2021 | Zhang et al. | |
| 2021/0334505 A1 | 10/2021 | Lin et al. | |

* cited by examiner

*Primary Examiner* — Jacky X Zheng
(74) *Attorney, Agent, or Firm* — WPAT, PC

(57) ABSTRACT

The present invention saves space by having an image sensor testing system that includes an image capturing module, an image storage module, and a signal processing module that are integrated on a mainboard. The mainboard uses multiple wires to respectively electrically connect to the image capturing module, the image storage module, and the signal processing module, and the image storage module is electrically connected to the image capturing module and the signal processing module. The image capturing module captures an image signal generated by an image sensor, the image storage module stores the image signal, and the signal processing module processes the image signal into a processed image signal and analyzes the processed image signal to obtain an image test value. The image capturing module and the signal processing module both directly access the image storage module, allowing the image test value to be calculated with less processing time.

8 Claims, 4 Drawing Sheets

IMAGE SENSOR TESTING SYSTEM

CROSS-REFERENCE TO RELATED APPLICATION(S)

This application claims the priority benefit of TW application serial No. 111212573 filed on Nov. 16, 2022, the entirety of which is hereby incorporated by reference herein and made a part of specification.

BACKGROUND OF THE INVENTION

1. Field of the Invention

The present invention relates to a testing system, more particularly an image sensor testing system.

2. Description of the Related Art

With reference to FIG. 4, a block diagram of a conventional image sensor testing system 2 is shown. The conventional image sensor testing system 2 includes an image capturing module 21, a signal processing module 23, a signal transfer module T2, an image sensor I2 (a device under test, also known as DUT), a light source S2, a test station machine M2, and a work station W2. The modules, components, machine, and the work station W2 are each respectively connected by wired connections, such as wired cables, or by wireless connections for transmitting signals.

The work station W2 is connected to the test station machine M2, and the work station W2 loads a testing program into the test station machine M2. The test station machine M2 generates a driver signal to the image sensor I2 (DUT) by executing the testing program, and the test station machine M2 further generates a light source control signal to the light source S2.

The light source S2 generates multiple light source signals of different brightness according to the light source control signal. The image sensor I2 (DUT) is driven by the driver signal. The image sensor I2 (DUT) not only may be a Complementary Metal-Oxide-Semiconductor image sensor (CMOS image sensor, or CIS), but also may be an image module, such that the image sensor (DUT) is able to generate image signals corresponding to the light source signals of different brightness. For example, when the light source S2 emits a red light signal as a light source signal, the image sensor I2 (DUT) generates an image signal corresponding to the red light signal.

The image capturing module 21 is connected to the image sensor I2 (DUT) through the signal transfer module T2, and the image capturing module 21 further captures the image signals generated by the image sensor I2 (DUT) through the signal transfer module T2. The signal transfer module T2 includes an interface board for receiving and transferring the image signals generated by the image sensor I2 (DUT) to the image capturing module 21.

The image capturing module 21 is connected to the signal processing module 23 through the wired connections, and the image capturing module 21 transmits the image signals to the signal processing module 23 through the wired connections.

The signal processing module 23 processes the image signals into image sensory values and further analyzes whether the image sensory values correspond to the light source signals. For example, when the light source S2 emits a blue light signal as a light source signal, the image sensor I2 (DUT) receives the blue light signal and generates a corresponding image signal according to the blue light signal. The signal processing module 23 processes the corresponding image signal into a processed image sensory value, and further analyzes whether the image sensor I2 (DUT) is capable of accurately generating the image sensory value corresponding to the blue light signal according to the processed image sensory value.

As previously mentioned, the image capturing module 21 and the signal processing module 23 of the conventional image sensor testing system 2 are connected through wired connections, and thus the image capturing module 21 transmits the image signals through the wired connections to the signal processing module 23 in order for the image signals to be processed and analyzed by the signal processing module 23. However, as the image capturing module 21 and the signal processing module 23 are set up separately away from each other, regardless of types of the wired connections used, the image signals are being transferred too slow from the image capturing module 21 through the wired connections to the signal processing module 23. Due to the aforementioned slow signal transportation between the image capturing module 21 and the signal processing module 23, the image signals are also processed and analyzed by the signal processing module 23 taking a great amount of overall processing time.

For instance, when the image capturing module 21 captures an image with million pixels, the image of 50 million pixels roughly corresponds to data size of 100 million bytes (Mbyte). When using an ethernet cable with gigabyte data transfer speed to transfer the image, a data transfer speed of 133 Mbyte per second is thus used to transfer the image, and will amount to 0.75 second of data transfer time for transferring the image.

On the other hand, the signal processing module 23 that processes the image is often a server level processing equipment that is expensive and takes up huge amount of physical space. When demands call for having the signal processing module 23 to simultaneously test and process large amounts of the image sensors I2, the signal processing module 23 needs great amount of time to complete the task. Due to the above reasons, the conventional image sensor testing system 2 is both too slow in transferring signal and too costly. A solution is needed to improve upon the aforementioned shortcomings associated with the conventional image sensor testing system 2.

SUMMARY OF THE INVENTION

To overcome the aforementioned shortcomings, the present invention provides an image sensor testing system. The image sensor testing system includes an image capturing module, an image storage module, a signal processing module, and a mainboard. The image storage module is electrically connected to the image capturing module and the signal processing module. The image capturing module, the image storage module, and the signal processing module are all mounted on the mainboard, and the mainboard uses multiple wires to respectively electrically connect to the image capturing module, the image storage module, and the signal processing module.

The image capturing module captures an image signal generated by an image sensor, the image storage module stores the image signal, and the signal processing module processes the image signal into a processed image signal and analyzes the processed image signal to obtain an image test value. The image sensor generates the image signal according to a light signal that is generated from a light source. The light source generates the light signal according to a control signal that is generated from a test station machine, and the test station machine generates the control signal by executing a testing program that is loaded from a work station. The image capturing module and the signal processing module both directly access the image storage module.

By having the image capturing module, the image storage module, and the signal processing module all integrated on the mainboard, the image sensor testing system of the present invention allows the image signal captured by the image capturing module to be directly stored in the image storage module through integrated circuits of the mainboard. Without needing wired connections to transfer the image signal, the present invention takes significantly less time in transferring the image signal, and thus further allows the signal processing module to access, analyze, and compare the image signal with less overall processing time. In fact, the image signal looks like it is transferred almost instantly. In other words, since the image capturing module and the image processing module are both electrically connected to the image storage module, the image processing module is able to directly access the image signal from the image storage module that is first captured by the image capturing module and stored in the image storage module. As such, the present invention greatly reduces time required for storing and processing the image signal.

Furthermore, since the image capturing module, the image storage module, and the signal processing module are all integrated on the mainboard, and through having integrated circuit designs on the mainboard, module size of the said modules can be minimized for occupying less physical space on the mainboard.

DETAILED DESCRIPTION OF THE INVENTION

Figure 1:
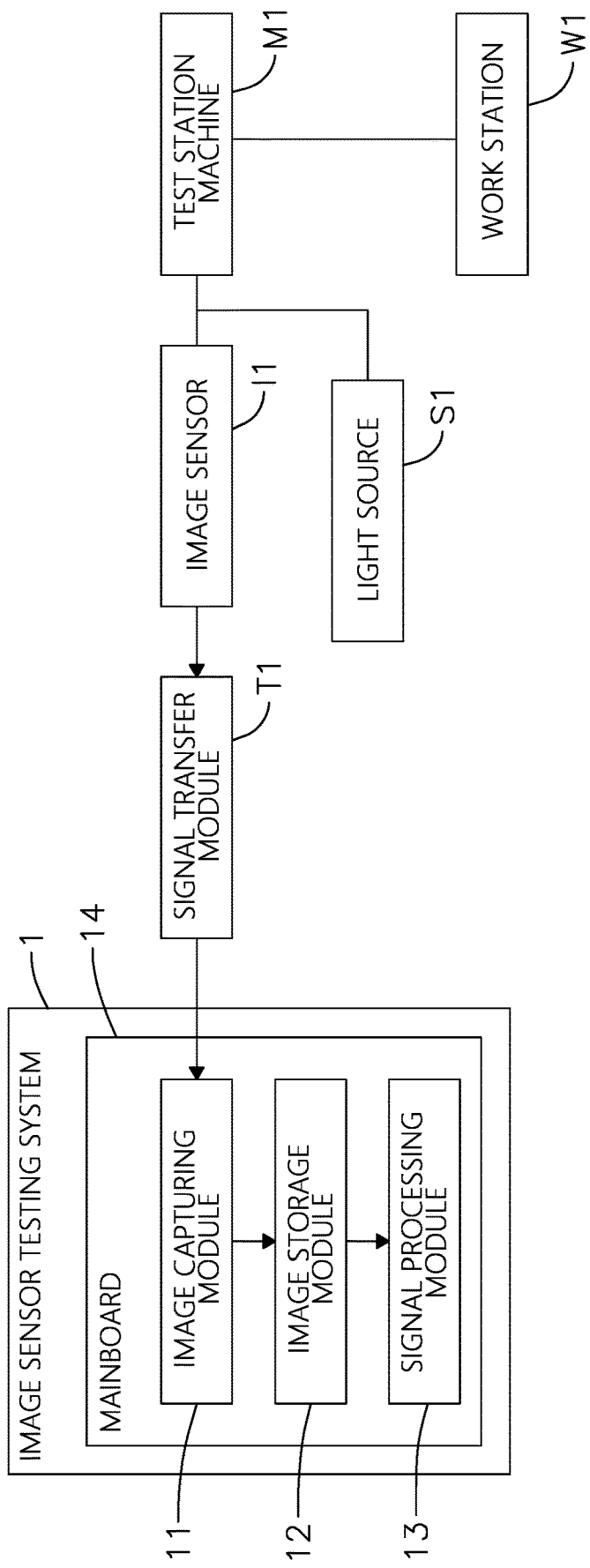
FIG. 1 is a block diagram of an image sensor testing system of the present invention.

With reference to FIG. 1, a block diagram of an image sensor testing system of the present invention is shown. An image sensor testing system 1 of the present invention includes an image capturing module 11, an image storage module 12, a signal processing module 13, and a mainboard 14. The image storage module 12 is electrically connected to the image capturing module 11 and the signal processing module 13.

In an embodiment, the image capturing module 11 is an image capture card, and the image capture card captures an image signal generated by an image sensor I1 (a device under test, also known as DUT). The image sensor I1 (DUT) is a Complementary Metal-Oxide-Semiconductor image sensor (CMOS image sensor, or CIS). In other embodiments, the image sensor I1 (DUT) can also suitably be an image module with a Charge-coupled Device (CCD) sensor or any other type of image sensor. The image storage module 12 is a memory or a memory card, and the image storage module 12 stores the image signal. The signal processing module 13 is a digital signal processor (DSP) or a graphic processing unit (GPU). The DSP or the GPU are high performance computing (HPC) units that are able to first processes the image signal into a processed image signal, then analyzes the processed image signal for obtaining an image test value with significantly reduced processing time as compared to using a central processing unit (CPU) for executing the said steps. In other words, by having the signal processing module 13 as a DSP or a GPU rather than a CPU, the present invention is able to further reduce time required for processing various signals.

The image capturing module 11, the image storage module 12, and the signal processing module 13 are all mounted on the mainboard 14. The mainboard 14 uses multiple wires to respectively electrically connect to the image capturing module 11, the image storage module 12, and the signal processing module 13. The said multiple wires on the mainboard 14, for example, are a circuit of a data bus.

A work station W1 loads a testing program to a test station machine M1. The test station machine M1 generates a driver signal to the image sensor I1 (DUT) by executing the testing program, and the test station machine M1 also generates a control signal to a light source S1. The light source S1 generates a light signal to the image sensor I1 (DUT) according to the control signal. The image sensor I1 (DUT) captures the light signal generated by the light source S1 and thus generates the image signal according to the light signal. Furthermore, the image capturing module 11 is connected to the image sensor I1 (DUT) through a signal transfer module T1. The signal transfer module T1 captures, collects, and transfers the image signal generated by the image sensor I1 (DUT) to the image capturing module 11. The image capturing module 11 and the signal processing module 13 both directly access the image storage module 12. In an embodiment, the signal transfer module T1 is an interface board. For example, the interface board is a prober interface board (PIB), allowing the signal transfer module T1 to be used in conjuncture with a circuit probe (CP) process for testing wafers. In other embodiments, the interface board of the signal transfer module T1 is a load board, allowing the signal transfer module T1 to be used in conjuncture with a final test (FT) process or a module test process.

Figure 2:
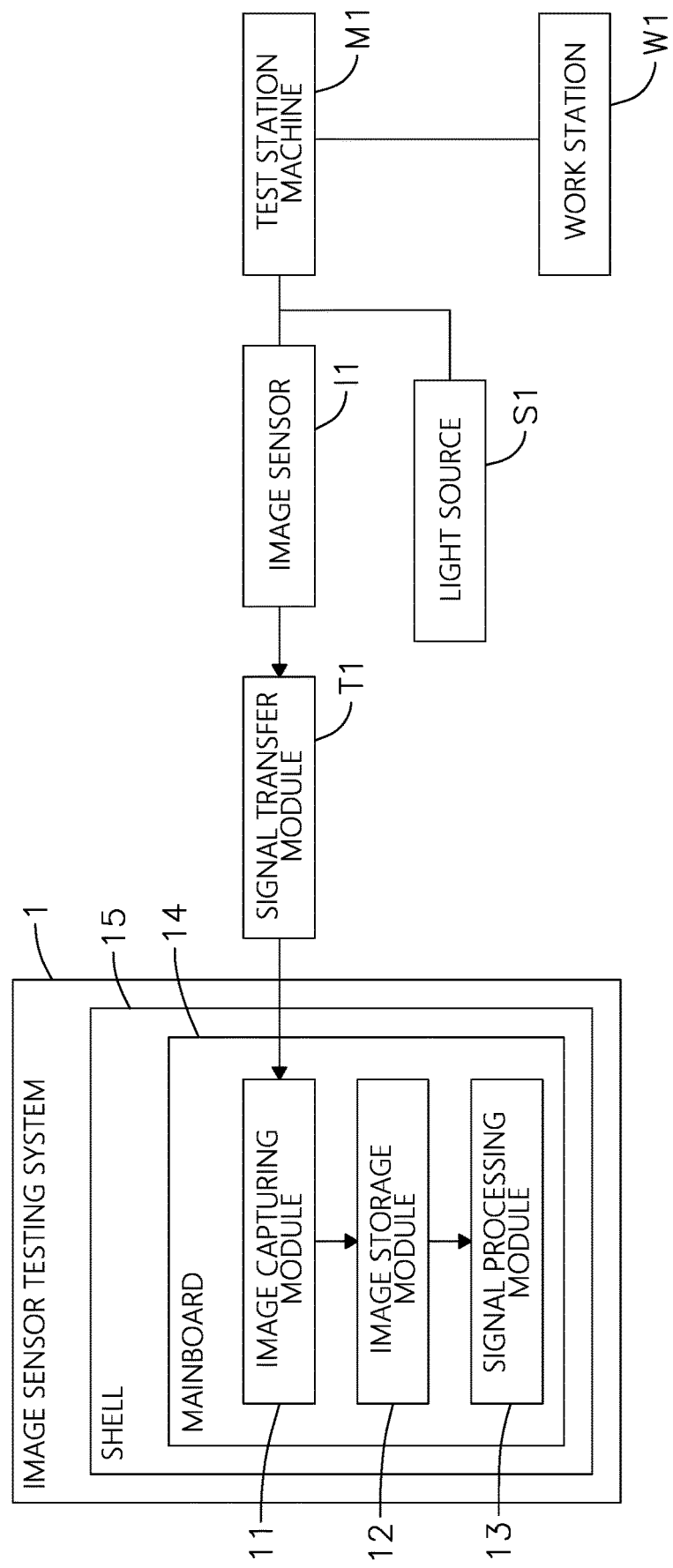
FIG. 2 is a block diagram of the image sensor testing system of the present invention with a shell.

With reference to FIG. 2, the image sensor testing system 1 of the present invention further includes a shell 15. The mainboard 14 is installed within the shell 15, allowing the shell 15 to protect the mainboard 14 along with each of the components mounted on the mainboard 14.

The image storage module 12 further stores an image standard value that corresponds to the light signal. The signal processing module 13 compares and analyzes the image test value and the image standard value for generating a comparison result. In other words, the image sensor I1 (DUT) is being tested through the steps of obtaining the image standard value that corresponds to the light signal generated from the light source S1, obtains the image signal generated by the image sensor I1 (DUT) for sensing the light signal, further obtains the image test value that is processed from the image signal by the signal processing module 13, and compares and analyzes whether the image test value matches the image standard value by the signal processing module 13. When the image test value matches the image standard value, a conclusion can be made that the image sensor I1 (DUT) is able to accurately generate the image test value according to the light signal.

Figure 3:
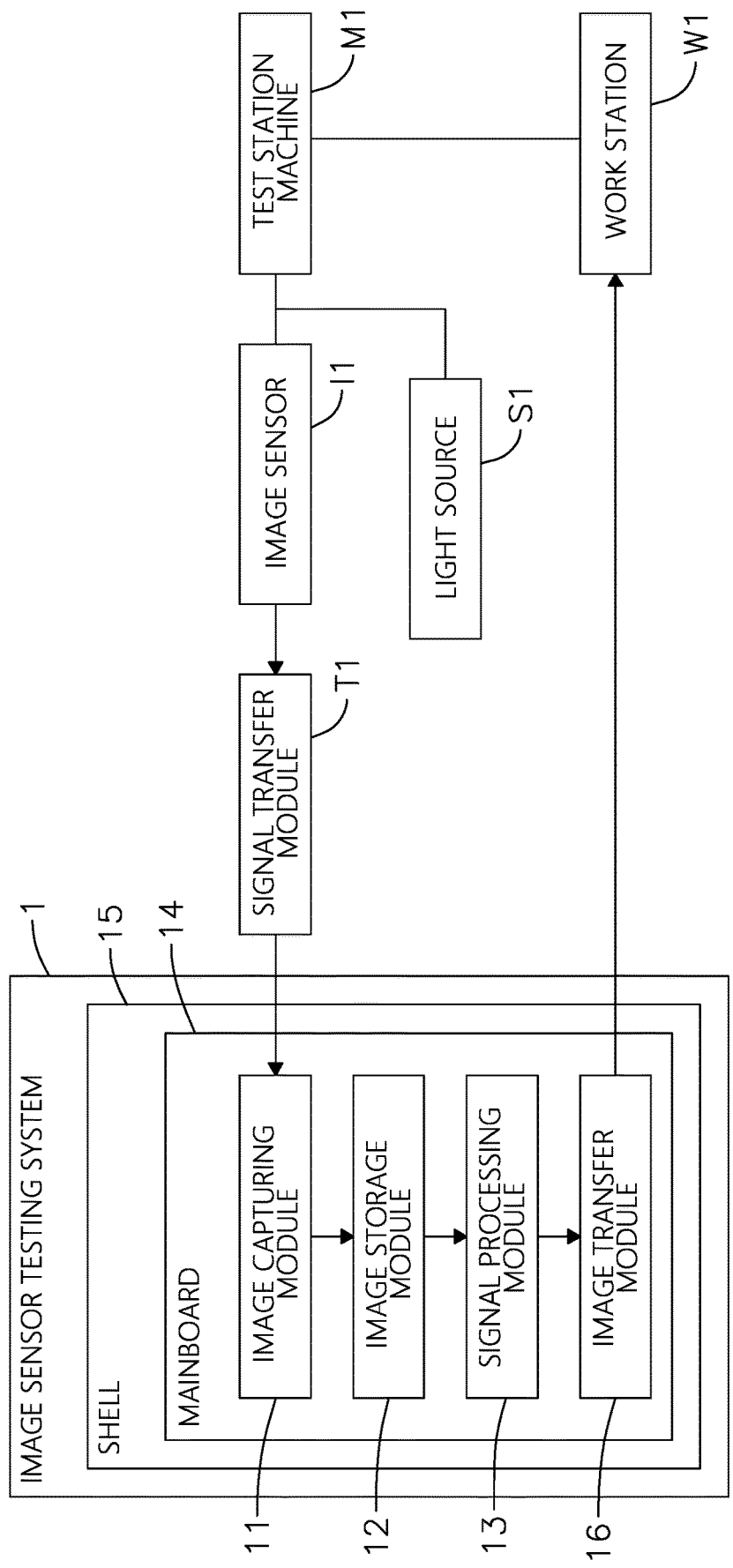
FIG. 3 is a block diagram of the image sensor testing system of the present invention with an image transfer module.
Figure 4:
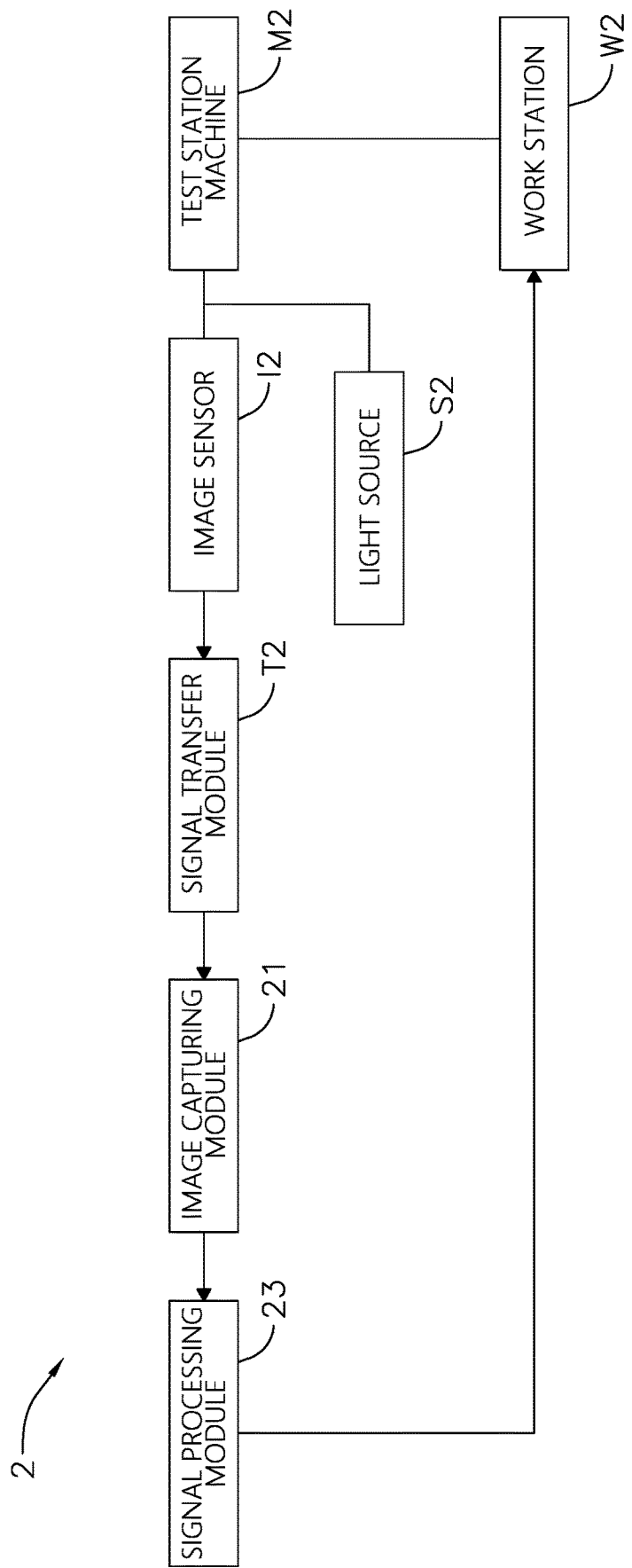
FIG. 4 is a block diagram of a conventional image sensor testing system.

With reference to FIG. 3, the image sensor testing system 1 further includes an image transfer module 16. The image transfer module 16 is electrically connected to the work station W1 and the signal processing module 13. More particularly, the image transfer module 16 is also mounted on the mainboard 14, and the image transfer module 16 is electrically connected to the signal processing module 13 through the wires on the mainboard 14. The signal processing module 13 transmits the comparison result through the image transfer module 16 to the work station W1, and thus allows the work station W1 to display the comparison result. More particularly, the image transfer module 16 transfers the comparison result to the work station W1 through wires or wireless means.

In an embodiment of the present invention, the image capturing module 11, the image storage module 12, and the signal processing module 13 are integrated into an integrated circuit module, and the integrated circuit module includes multiple pins. The pins are electrically connected to the circuit of the data bus of the mainboard 14, and thus forming electrical connections. In another embodiment, the pins are directly electrically connected to the mainboard 14. In another embodiment, the image capturing module 11, the image storage module 12, and the signal processing module 13 are independently mounted on the mainboard 14; however, the image capturing module 11, the image storage module 12, and the signal processing module 13 can still stay electrically connected with each other through the circuit of the data bus on the mainboard 14. In other words, through integrated circuit designs, each of the modules can transfer data and signals between each other with less time. Furthermore, through integrated circuit designs, a manufacturing cost for building the image sensor testing system 1 is reduced, and a physical size of the image sensor testing system 1 is also reduced.

In conclusion, the image sensor testing system 1 of the present invention integrates the image capturing module 11, the image storage module 12, and the signal processing module 13 on the mainboard 14 for having electrical connections on the mainboard 14. As such, the image capturing module 11 is able to capture the image signal and conveniently stores the image signal into the image storage module 12 through integrated circuits of the mainboard 14. Without requiring wired connections for transporting the image signal, the image signal requires less time to transfer from one module to another. In fact, the image signal is transferred almost instantly from one module to another.

As a result, the signal processing module 13 is able to take less time to access the image signal from the image storage module 12, and thus the signal processing module 13 is able to analyze and compare the image signal with less overall processing time. In other words, since both the image capturing module 11 and the signal processing module 13 are electrically connected to the image storage module 12, the image processing module 13 is able to directly access the image signal from the image storage module 12 that is first captured by the image capturing module 11 and stored in the image storage module 12. As such, the present invention greatly reduces time required for storing and processing the image signal.

Furthermore, since the image capturing module 11, the image storage module 12, and the signal processing module 13 are all integrated on the mainboard 14, and through having integrated circuit designs on the mainboard 14, module size of the said modules can be minimized for occupying less physical space on the mainboard 14.

What is claimed is:

1. An image sensor testing system, comprising:
    an image capturing module, capturing an image signal generated by an image sensor;
    an image storage module, electrically connected to the image capturing module, and storing the image signal;
    a signal processing module, electrically connected to the image storage module, processing and analyzing the image signal for obtaining an image test value; and
    a mainboard, wherein the image capturing module, the image storage module, and the signal processing module are mounted on the mainboard, and the mainboard uses multiple wires to respectively electrically connect to the image capturing module, the image storage module, and the signal processing module;
    wherein the image sensor generates the image signal according to a light signal that is generated from a light source, the light source generates the light signal according to a control signal that is generated from a test station machine, and the test station machine generates the control signal by executing a testing program that is loaded from a work station;
    wherein the image capturing module and the signal processing module both access the image storage module.

2. The image sensor testing system as claimed in claim 1, further comprising:
    a shell, wherein the mainboard is installed within the shell.

3. The image sensor testing system as claimed in claim 1, wherein the image storage module stores an image standard value that corresponds to the light signal;
    wherein the signal processing module compares and analyzes the image test value and the image standard value for generating a comparison result.

4. The image sensor testing system as claimed in claim 3, further comprising:
    an image transfer module, electrically connected to the work station and the signal processing module, and mounted on the mainboard;
    wherein the image transfer module is electrically connected to the signal processing module through the wires on the mainboard;
    wherein after the signal processing module transmits the comparison result through the image transfer module to the work station, the work station displays the comparison result.

5. The image sensor testing system as claimed in claim 4, wherein the wires are a circuit of a data bus.

6. The image sensor testing system as claimed in claim 1, wherein the image capturing module, the image storage module, and the signal processing module are integrated into an integrated circuit module;
    wherein the integrated circuit module comprises multiple pins, and the multiple pins are electrically connected to the mainboard.

7. The image sensor testing system as claimed in claim 1, wherein the wires are a circuit of a data bus;
    wherein the image capturing module, the image storage module, and the signal processing module are electrically connected through the circuit of the data bus.

8. The image sensor testing system as claimed in claim 1, wherein the wires are a circuit of a data bus;
    wherein the image capturing module, the image storage module, and the signal processing module are an integrated circuit module;
    wherein the integrated circuit module comprises multiple pins, and the multiple pins are electrically connected through the circuit of the data bus.

* * * * *